US009221079B1

(12) United States Patent
Daboub et al.

(10) Patent No.: US 9,221,079 B1
(45) Date of Patent: Dec. 29, 2015

(54) SYSTEM AND METHOD FOR REAL-TIME ADDRESS CORRECTION

(75) Inventors: Henry Daboub, Arlington, TX (US); Tom Glassman, Colleyville, TX (US); Jeremy S. McWilliam, Arlington, TX (US); Tom Grauberger, Venus, TX (US)

(73) Assignee: National Presort, Inc., Fort Worth, TX (US)

( * ) Notice: Subject to any disclaimer, the term of this patent is extended or adjusted under 35 U.S.C. 154(b) by 723 days.

(21) Appl. No.: 13/565,099

(22) Filed: Aug. 2, 2012

Related U.S. Application Data

(60) Provisional application No. 61/670,274, filed on Jul. 11, 2012, provisional application No. 61/514,235, filed on Aug. 2, 2011.

(51) Int. Cl.
*G06K 9/00* (2006.01)
*B07C 3/00* (2006.01)

(52) U.S. Cl.
CPC .... *B07C 3/00* (2013.01); *G06K 9/00* (2013.01)

(58) Field of Classification Search
None
See application file for complete search history.

(56) References Cited

U.S. PATENT DOCUMENTS

| | | | | |
|---|---|---|---|---|
| 5,612,889 | A * | 3/1997 | Pintsov et al. | 700/226 |
| 6,292,709 | B1 * | 9/2001 | Uhl et al. | 700/226 |
| 6,557,000 | B1 * | 4/2003 | Seestrom et al. | 707/752 |
| 7,436,979 | B2 * | 10/2008 | Bruce et al. | 382/101 |
| 7,834,289 | B2 * | 11/2010 | Orbke et al. | 209/584 |
| 8,195,575 | B2 * | 6/2012 | Krause et al. | 705/67 |
| 8,930,475 | B1 * | 1/2015 | North et al. | 709/206 |
| 2004/0120547 | A1 * | 6/2004 | Mampe et al. | 382/101 |
| 2008/0008383 | A1 * | 1/2008 | Andel et al. | 382/173 |
| 2008/0093273 | A1 * | 4/2008 | Stemmle | 209/584 |
| 2011/0093117 | A1 * | 4/2011 | Rundle et al. | 700/219 |
| 2011/0093546 | A1 * | 4/2011 | Rubingh | 709/206 |
| 2011/0213700 | A1 * | 9/2011 | Sant'Anselmo | 705/39 |
| 2011/0286626 | A1 * | 11/2011 | Sipe | 382/101 |
| 2012/0051587 | A1 * | 3/2012 | Carpenter | 382/101 |
| 2013/0024326 | A1 * | 1/2013 | Dearing et al. | 705/26.61 |
| 2013/0044350 | A1 * | 2/2013 | Mungo | 358/1.15 |

OTHER PUBLICATIONS

David Hawkins, "Siemens Launches New Universal UMove" published Dec. 7, 2011, 4 pages.

* cited by examiner

*Primary Examiner* — Vikkram Bali
(74) *Attorney, Agent, or Firm* — James E. Walton

(57) ABSTRACT

A system and method by which mail sorting equipment can correct postal addresses utilizing cloud technology.

5 Claims, 6 Drawing Sheets

SYSTEM AND METHOD FOR REAL-TIME ADDRESS CORRECTION

This application claims the benefit of U.S. Provisional Patent Application No. 61/670,274 filed 11 Jul. 2012, titled "SYSTEM AND METHOD FOR REAL-TIME ADDRESS CORRECTION," and No. 61/514,235 filed 2 Aug. 2011, titled "SYSTEM AND METHOD FOR REAL-TIME ADDRESS CORRECTION," which are hereby incorporated by reference for all purposes as if fully set forth herein.

BACKGROUND

1. Field of the Invention

The present application relates to a system and method by which mail sorting equipment can correct postal addresses utilizing cloud technology.

2. Description of Related Art

In conventional methods of processing mail, if processor does not have the correct mailing destination, the mailer will exhaust delivery time and handling costs. These costs are currently absorbed by the Postal Service, and the time is absorbed by the recipient. The rehandling of addressed mail is affecting postal systems both domestically and international by having to redirect the mail pieces.

Older sorters rely upon local databases to obtain change of address information (COA). These local databases must be repeatedly updated to ensure they are up to date. Previously the owners of the COA databases relied on physical distribution to update the COA databases in the hands of the mail sorters.

Although great strides have been made in mail processing, considerable shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
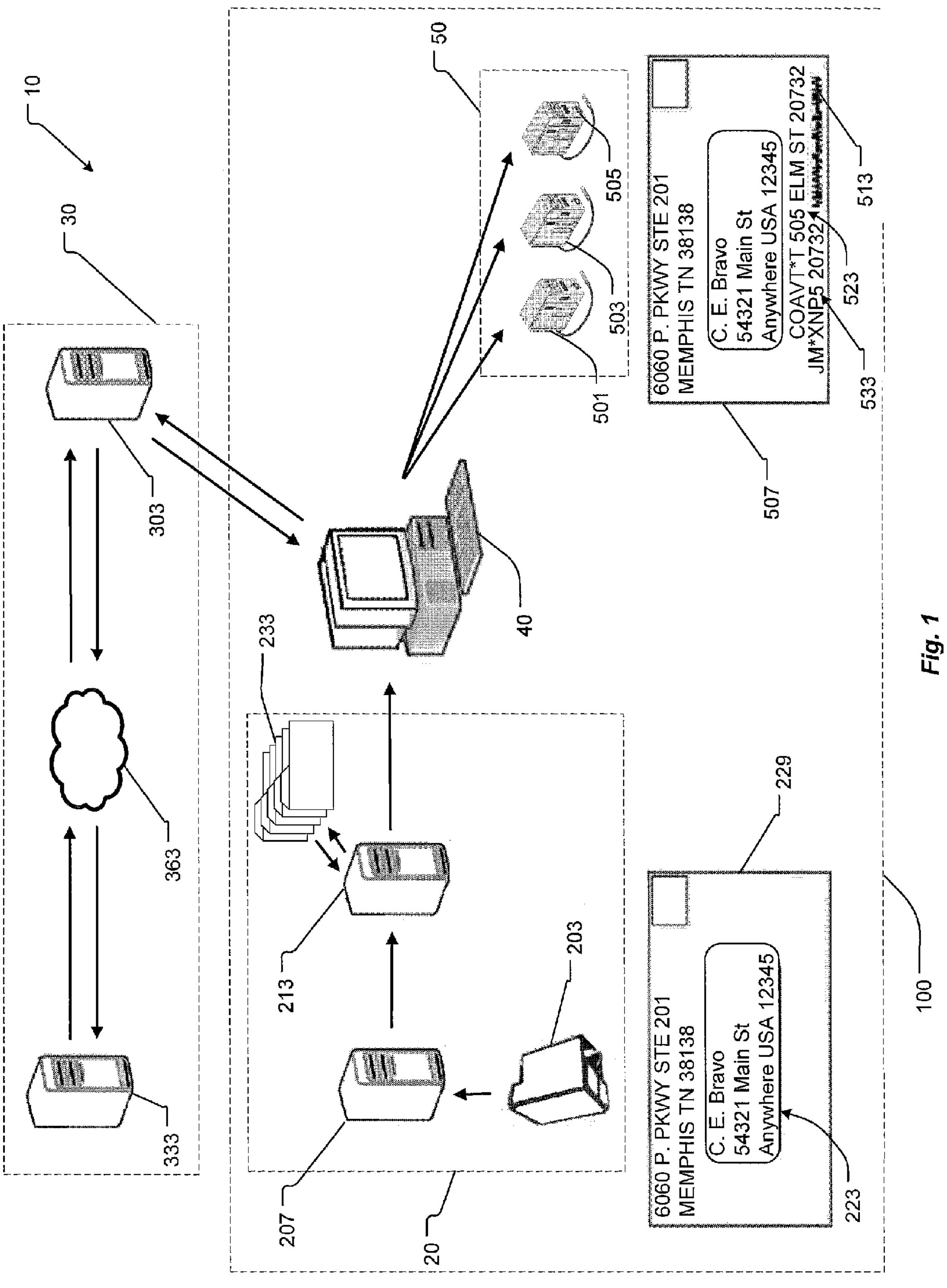
FIG. 1 is a schematic view of a system and method according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A sorter is a machine utilized for sorting letter mail and/or flats mail or parcels, which are hereafter referred to generically as "mail." The address is electronically lifted off the mail piece so that the address can be standardized and potentially looked up in a data base of address changes. Previous address correction was done within a local area network to a localized database. The system and method as described by this application is utilized as part of a mail sorter machine. The process must be completed at a high speed while the piece of mail is in the sorter. High speed sorter such as would utilize this system and method process tens of thousands of pieces of mail each hour.

Referring now to FIG. 1 in the drawings, a schematic of the preferred system 10 and method is shown. System 10 utilizes the following method for correcting address for Patrons that have moved. The system is comprised of a vision system 20, a forwarding system 30, a controller 40, and a printer system 50.

In the preferred embodiment, the first step includes reading images from the mail pieces. In particular, the Multi Line Character reader of system 10 has a vision system that lifts the image from the mail piece. Once the image is lifted it is translated into a binary Tiff (or a file format specific to the vision system).

Vision system 20 consists of a camera 203, a first computer 207, and a second computer 213. The camera 203 electronically lifts the image of an address 223 from the mail piece 229 and converts this image into a binary record (system useable record) with help of the first computer 207. The first computer 207 sends the image to the second computer 213. The second computer 213 performs optical character recognition (OCR) on the image. The result of the OCR is a record containing the translation of the image into a bunch of characters usable by the sorter. The second computer through the use of fuzzy logic generates multiple variations of the character interpretations for each mail piece 229. The Binary information or OCR results are then matched and modified against a first database 233 for standardizing the address information. It should be understood that first local database 233 while in the preferred embodiment is locally stored on second computer 213, in an alternative embodiment the first database 233 could be stored on a different computer either locally or remotely. The results of the standardization are then sent to the controller 40. It should be apparent that the camera 203, the first computer 207, and the second computer 213 could be combined into a single unit that takes a picture and generates an output of characters.

The controller 40 consists of a networked computer that controls the operation of the sorting machine 100. It should be understood that fuzzy logic is a form of many-valued logic that uses, the vision system's first, second, and third choice character interpretations, if available, for data found in the delivery address for matching in the postal database. Also, it should be understood that NPINuMuv is the name of a software package that takes the electronic lift of the address and translates the information into a format that can be used for lookup in the postal systems data base for address changes. NPINuMuv is a name of a software package that translates the record information into a format that can utilize the postal systems data base. Referring specifically to the NPINuMuv translation process, the Electronic lift of the address from the OCR needs to be translated, prioritized, and presented to the postal system data base in a specific format. The controller 40 sends the translated record to the forwarding system 30.

Forwarding system 30 consists of a local computer 303, a remote computer 333, and a cloud 363. Local computer 303 is connected to the sorter 100 via a local area network which connects the controller 40 to the local computer 303. The remote computer 333 is the postal systems data base for address changes and or address standardization. The remote computer 333 will be utilized through the cloud 363 and will be located at a remote site. All transmissions between local computer 303 and remote computer 333 will be encrypted.

Figure 2:
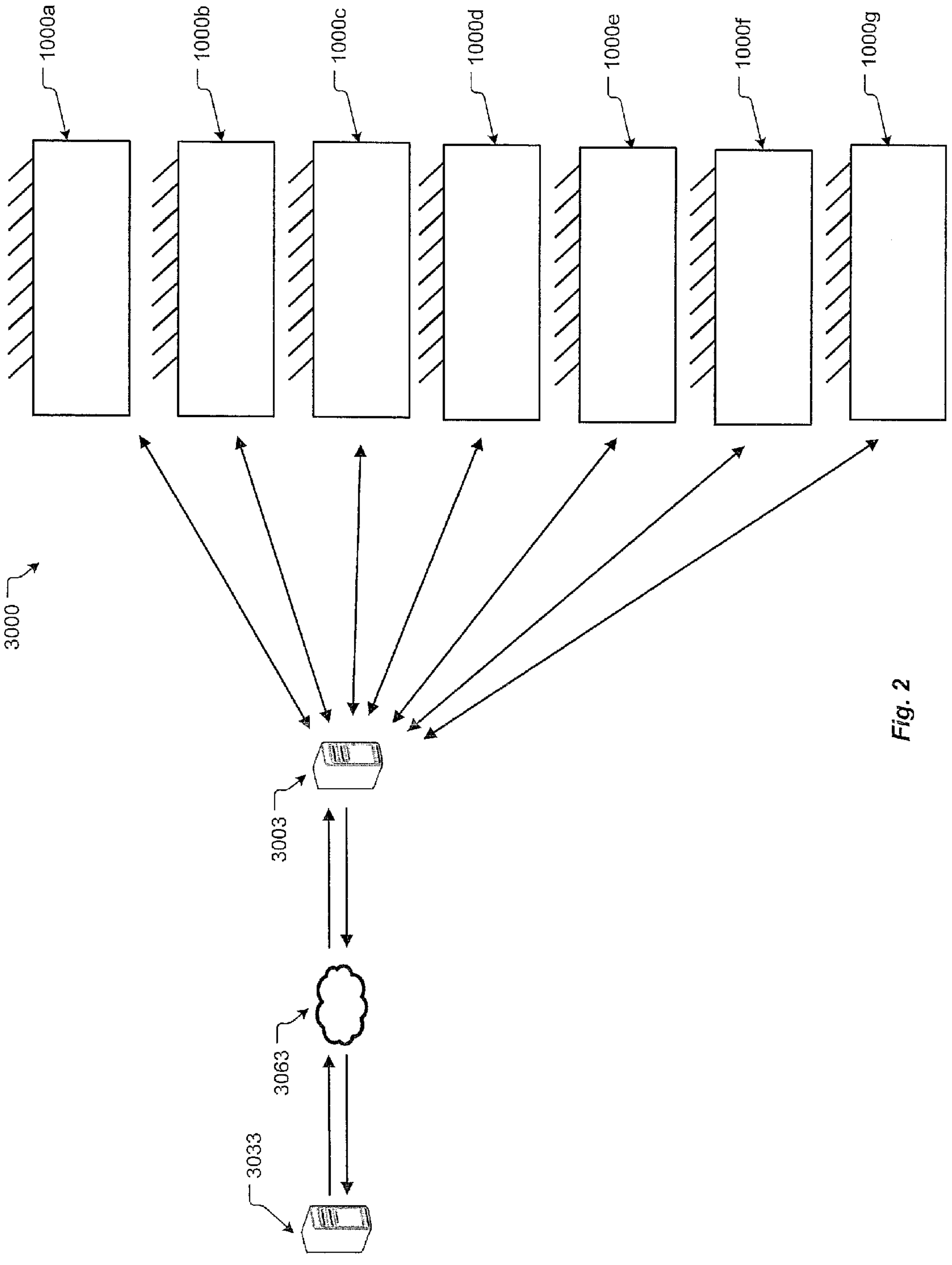
FIG. 2 is a schematic view of a group of postal sorter machines linked together and connected through the cloud to a single remote computer according to the present application.

Referring now also to FIG. 2 a diagram of multiple sorters connected to a single local computer 3003. A group of sorters 3000 consists of multiple sorters 1000*a*-1000*g*. The group of sorters 3000 connects to a single local computer 3003. Local computer 3003 then connects to the remote computer 3033 through the cloud 3063.

Figure 3:
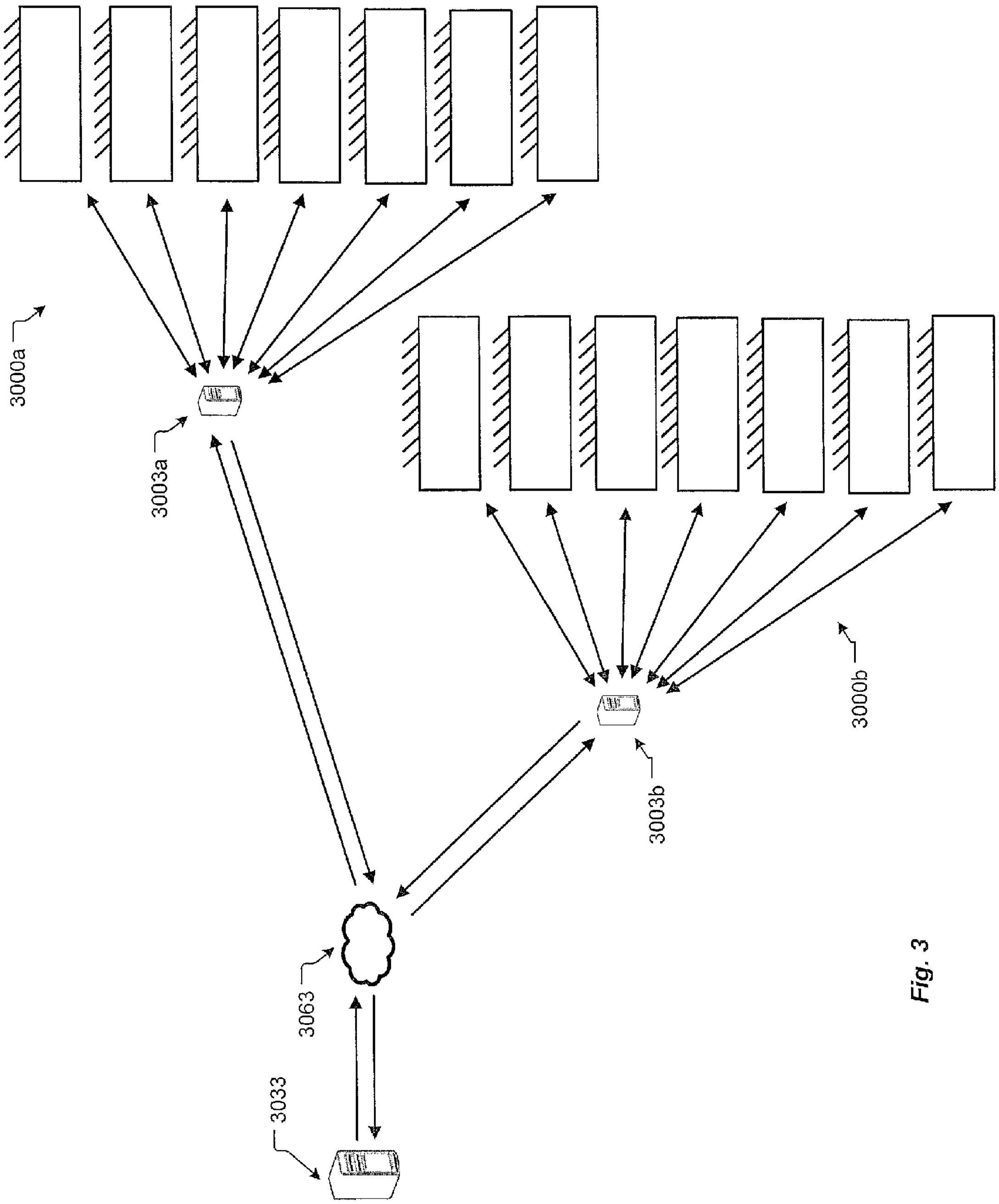
FIG. 3 is a schematic view of multiple groups of postal sorter machines linked together and connected through the cloud to a single remote computer according to the present application.

Referring now also to FIG. 3 a diagram of multiple local computers each with a multitude of sorters connected to the cloud. A first group of sorters 3000*a* connects to a first local computer 3003*a*. First local computer 3003*a* connects to the remote computer 3033 through the cloud 3063. Additional groups of sorters could be added so long as they were connected to a different local computer, the max number of sorters than can be added to a local computer is seven. Second group of sorters 3000*b* is connected to second local computer 3003*b* which is connected to remote computer 3033 through the cloud 3063. The process of the connecting sorters to the cloud is scalable.

Referring now back to FIG. 1 in the drawings. In the preferred embodiment the local computer 303 looks up the translated record in the remote computer 333 to see if a COA is on file. The remote computer 303 is connected to the local computer through a cloud 363. If the remote computer 333 has a change of address on file for the translated record then the remote computer 333 returns to the local computer 303 a COA. The COA is returned via the cloud network 363. The local computer 303 sends the COA to the controller 40. The controller then sends the COA to the printing system 50.

The cloud 363 is preferably an internet connection between the local computer 303 and remote computer 333. The connection to the cloud 363 and through the cloud 363 needs to be high speed in order for the data to be relayed from the sorter 100 to the local computer 303 though the cloud 363 to the remote computer 333 and then back from the remote computer 333 through the cloud 363 and then to the local computer 303 to the sorter 100 in such a short amount of time as the mail is still in the sorter to be sorted. The ideal response time from the sorter 100 to the remote computer 333 should be less than 100 milliseconds. Factors such as high data usage and heavy internet traffic can cause slowdowns on the cloud.

The printing system consists of a first printer 501, a second printer 503, and a third printer 505. The data from the controller 40 is sent to the printing system 50 for spraying onto the processed mail piece 507. The information that is sprayed can be in a couple of different forms. There could be a bar code 513 from the first printer 501, the bar code 513 could be an intelligent bar code. A visual address change could be printed such as COA code and new address 523 from the second printer 503 or a human readable automation marking and zip code 533 from the third printer 505. Additionally the new 523 could be annotated dependent upon what database the COA originated from.

Figure 4:
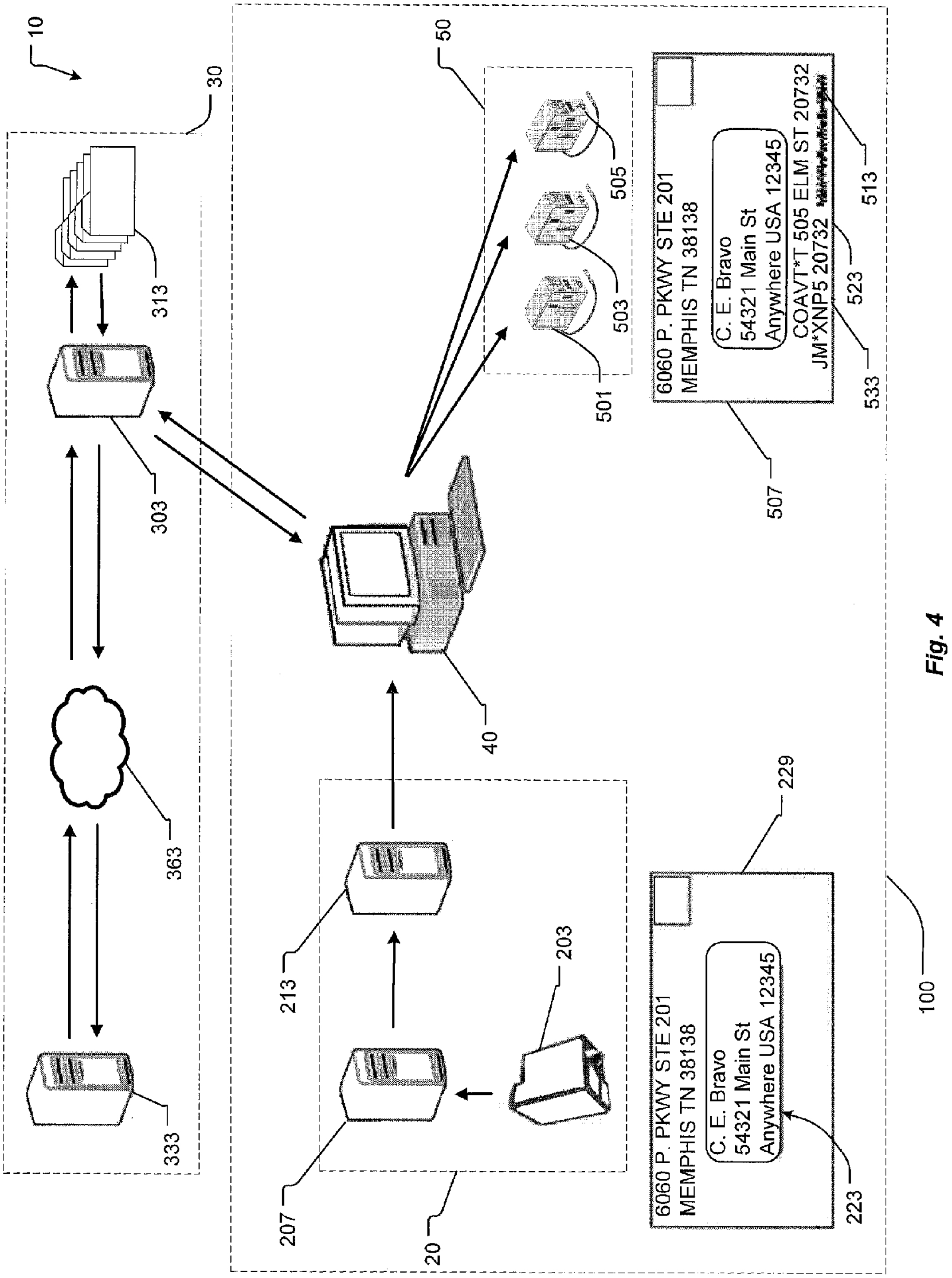
FIG. 4 is a schematic view of a system and method according to an optional embodiment of the present application that uses the United States Postal Service 00-Table Service subscription according to the present application.

Referring now also to FIG. 4 in the drawings, a schematic of the system is shown. In an alternative embodiment the local computer 303 compares the translated record from the controller 40 to a second local database 313. It should be understood that second local database 313 while in the preferred embodiment is locally stored on local computer 303, in an alternative embodiment the second local database 313 could be stored on a different computer either locally or remotely. Second local database 313 could be a 00-Table that is obtained from the United States Postal Service by subscription. If the translated record from the record does not match the second local database 313 there is no potential COA. Therefore there is no reason for the local computer 303 to check with the remote computer 333 through the cloud 363. Having the local computer 303 check for possible matches against the second local database 313 saves money, time, and processing cycles. If there is no COA the mail piece 229 receives the printed bar code 513 and is sorted to the proper bin. If the translated record does match a listing in the second local database 313 then, the local computer 303 checks with the remote computer 333 through the cloud 363. The cloud 363 may include globally networked computers, internet switches, hubs, digital storage mediums or computer-readable storage mediums, local area networks, wide area networks. Preferable the cloud 363 includes networked computers and computer-readable storage mediums providing a transmission path for data between the local computer 303 and the remote computer 333. In an alternative embodiment the cloud 363 includes processors capable of processing the data and transforming the data between the local computer 303 and the remote computer 333. The remote computer 333 then provides the local computer 303 with the COA. The local computer passes the COA to the controller 40. Controller 40 then sends the COA to the printer system 50 and then sort the mail piece 229 thereby creating a processed mail piece 507.

The 00-Table Service allows service providers to locally query whether a potential match can be made within the $\text{NCOA}^{Link}$ database, without sending data upstream through the internet cloud to the server. If there is no 00-Table match, the data base lookup result is sent to the sort decision computer so that the address information is bar coded onto the mail piece and sorted to the correct bin. If there is a 00-Table match, the data base lookup result is then processed through the cloud.

Figure 5:
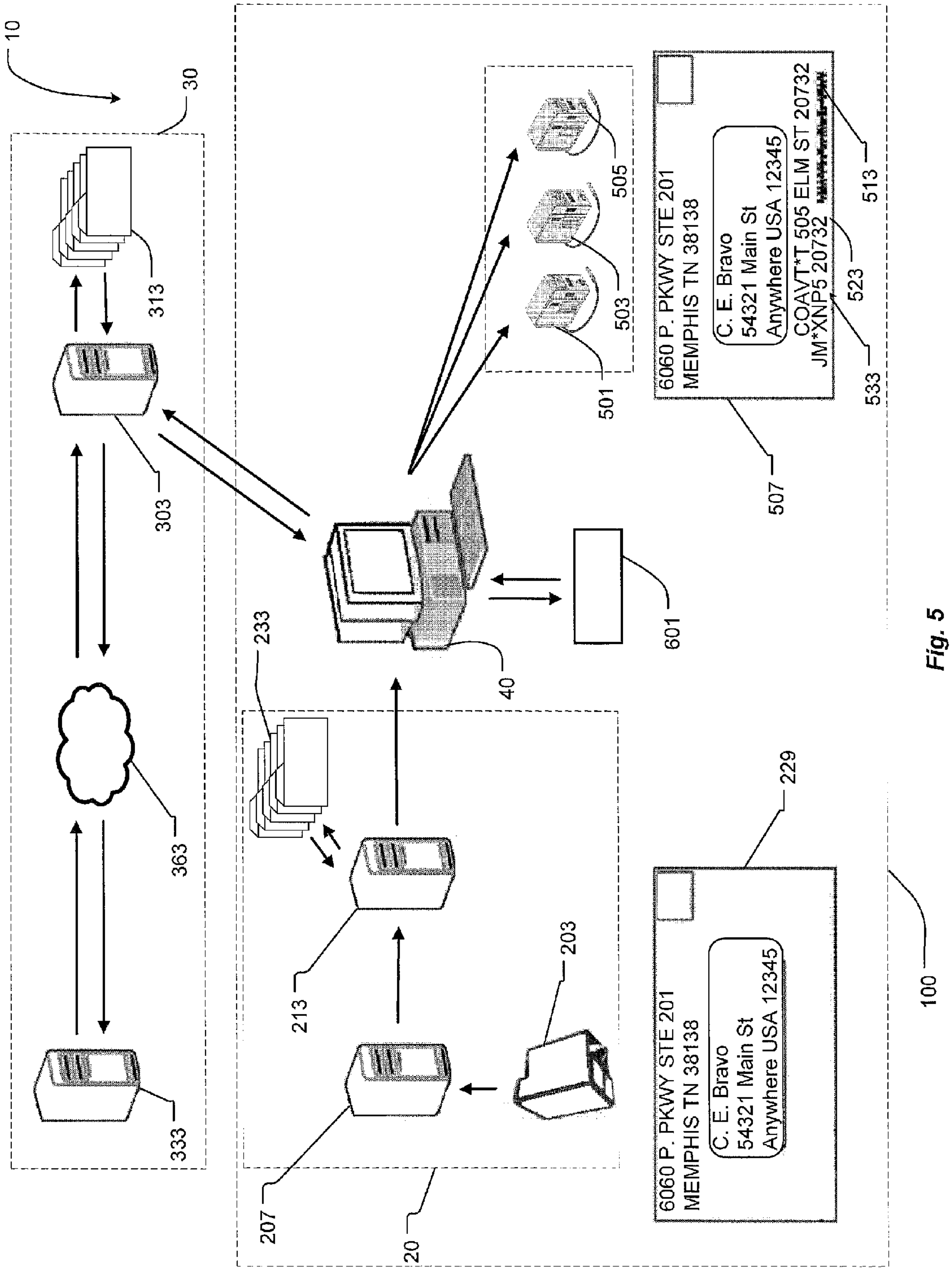
FIG. 5 is a schematic view of a system and method according to an optional embodiment of the present application that designates a unique COA Pass bin to accept mailpieces that did not receive a response from the postal service data base in time to print the required COA address and barcode during Pass 1 processing according to the present application.

Referring now also to FIG. 5, a schematic of the system and method according to an optional embodiment of the present application that designates a unique COA Pass (CPass) bin to accept mailpieces that did not receive a response from the remote computer 333 in time to print the required COA address 523 and barcode 513 during Pass 1 processing. In this instance, the result from the cloud 363 is locally data based 601 until such time as the mail in the CPass bin is restaged, reinducted, reread by OCR, and correlated to the Cloud result. The mailpiece is then printed with the required COA 523 address and barcode 513 and sorted accordingly to conclude Pass 1. It is important to note that only the original cloud lookup is necessary, and once the required COA address and barcode is printed on the mailpiece, the Cloud result is purged from the local database 601.

Figure 6:
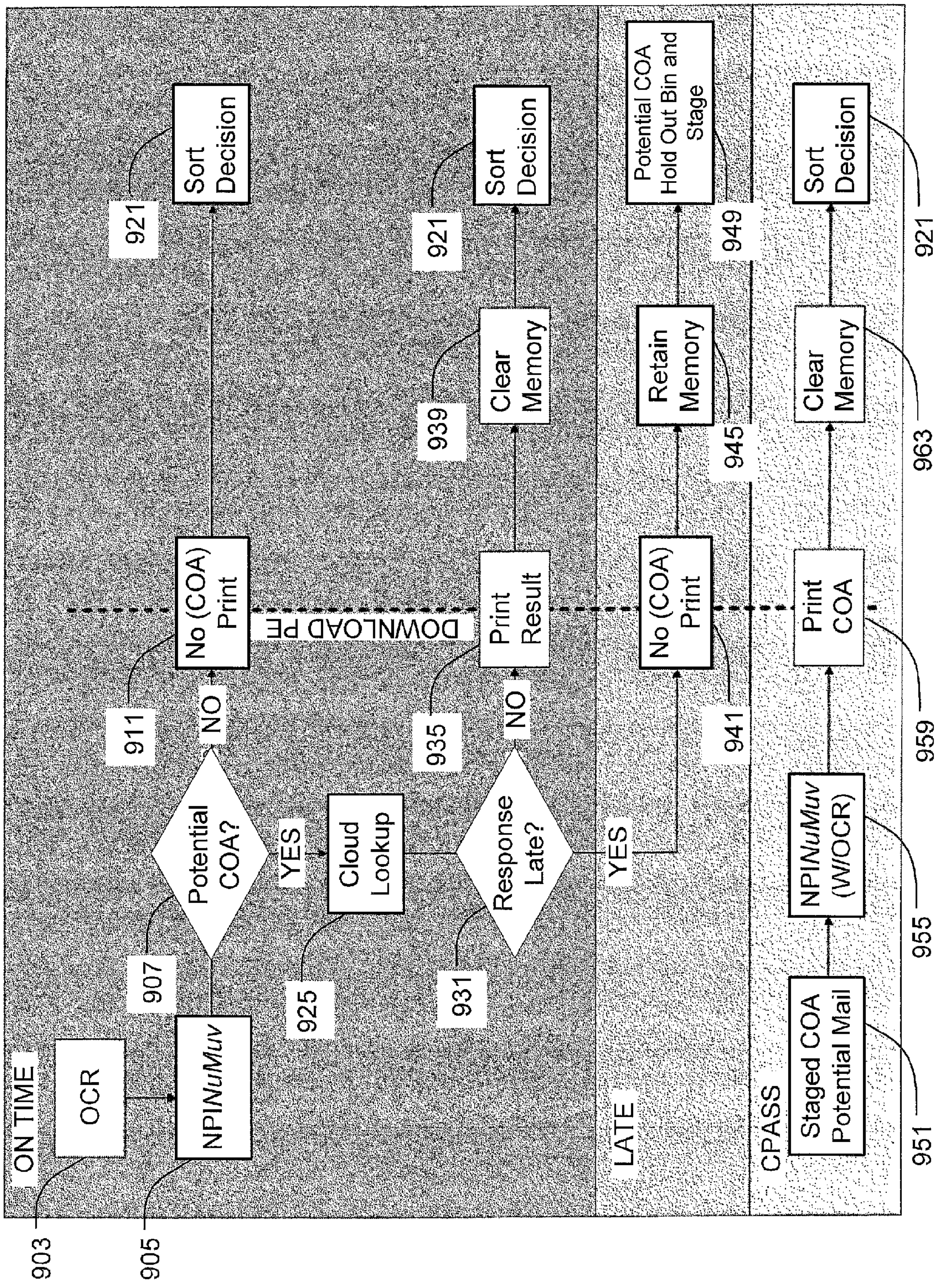
FIG. 6 is a block diagram of the method according to an optional embodiment of the present application that designates a unique COA Pass bin to accept mailpieces that did not receive a response from the postal service data base in time to print the required COA address and barcode during Pass 1 processing according to the present application.

Referring now also to FIG. 6, a block diagram of the method according to an optional embodiment of the present application that designates a unique COA Pass (CPass) bin to accept mailpieces that did not receive a response from the remote computer 333 in time to print the required COA address 523 and barcode 513 during Pass 1 processing. In this embodiment the mail piece 229 is read by the OCR system 903. The software 905 processes the decision determining if there is a potential COA 907. If there is no potential COA then nothing is printed 911 and the mailpiece is sorted 921. If there is a potential COA the software looks up the COA 925 from the cloud. The software has an expected timeframe to receive the response from the cloud. The software determines if the response from the cloud is late 931. If the response from the cloud is not late then, the COA is printed on the mailpiece 935. After printing the COA on the mailpiece the memory of the COA is cleared 939. The mailpiece is then sorted 921. If however the response from the cloud is late then the COA is not printed on the mail piece 941. The memory of the OCR read and the results from the cloud when received are retained 945. The mailpiece is then is routed to a Cpass bin 949. The Cloud result is locally data based until such time as the mail in the CPass bin is staged 951, inducted, read by OCR 955, and correlated to the Cloud result. The mailpiece is then printed with the required COA address and barcode 959. After printing the COA on the mailpiece the memory of the COA is cleared 963. Finally, the mailpiece is sorted 921 accordingly to conclude Pass 1. It is important to note that only the original Cloud lookup is necessary, and once the required COA address and barcode is printed on the mailpiece, the Cloud result is purged from the local database.

Additionally, it should be apparent that the vision system 20, the controller 40, the printer system 50, and the local computer 303 could be combined in a single unit. In an alternative embodiment the controller 40 directly communicates through the cloud 363 with the remote computer 333 without the need for the local computer 303.

It is apparent that an assembly and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of correcting addresses of mail articles in real time, comprising:

imaging an address from a mail piece to generate a textual record of the address;

accessing a remote database of change of address records through a cloud;

determining if a change of address record is located in a remote database based upon the textual record;

printing a change of address label on the mail piece if the change of address record exist in the remote database;

sorting the mail piece;

sorting the mail piece to a sort bin, if a time amount while determining a change of address from a remote database becomes too great;

storing the change of address for the mail piece in a memory buffer;

reimaging the mail piece at a later time;

utilizing the stored change of address; and deleting the stored change of address from the memory buffer;

wherein the cloud comprises a network of computers combined with a computer-readable storage medium providing a transmission path and a storage environment for data transmissions between a local computer and a remote computer.

2. The method according to claim 1, further comprising:

utilizing an optical character recognition camera in conjunction with a computer system in order to image the address.

3. The method according to claim 1, further comprising:

accessing a local database to determine if a potential change of address exist based upon the textual record of the address.

4. The method according to claim 3, further comprising:

eliminating the need for accessing a remote database of change of address records through the cloud if the local database does not have a potential change of address matching the textual record of the address.

5. The method according to claim 1, further comprising:

accessing a local database to determine if a potential change of address exist based upon the textual record of the address; and eliminating the need for accessing a remote database of change of address records through a cloud if the local database does not have a potential change of address matching the textual record of the address.

* * * * *